United States Patent [19]

Lewis

[11] 4,240,647
[45] Dec. 23, 1980

[54] PRESSURE-OPERATED FRICTION LOCKING APPARATUS FOR SLIDABLY ADJUSTABLE TRUCK TRAILER COUPLING

[76] Inventor: Milburn Lewis, 18418-94th Ave. NE., Bothell, Wash. 98011

[21] Appl. No.: 13,195

[22] Filed: Feb. 16, 1979

[51] Int. Cl.$^3$ .............................................. B62D 53/00
[52] U.S. Cl. .................................... 280/482; 280/404
[58] Field of Search ............... 280/482, 404, 426, 432, 280/478 A; 188/67, 129; 403/376, 377; 248/326, 354 H

[56] References Cited

U.S. PATENT DOCUMENTS

| | | | |
|---|---|---|---|
| 3,665,812 | 5/1972 | Hashimoto | 188/67 |
| 3,881,748 | 5/1975 | Donaldson | 280/404 |
| 3,972,540 | 8/1976 | Donaldson | 280/404 |

*Primary Examiner*—John J. Love
*Assistant Examiner*—Randall A. Schrecengost
*Attorney, Agent, or Firm*—Christensen, O'Connor, Johnson & Kindness

[57] ABSTRACT

In an elongate truck trailer tongue assembly having hollow, inner and outer telescoping tongue members movable between shortened and extended tongue positions, a remotely controlled, pneumatically actuated friction shoe is mounted within the tongue to selectively lock the tongue members in either the shortened or extended position. The tongue members are tubular and have square-shaped cross sections, and the friction shoe is shaped and mounted so as to be supported by the inner tubular member and, when actuated, to bear against interior wall surfaces of the outer tubular member, frictionally locking the members against relative movement and rigidifying the tongue assembly so that it acts as a unitary structure between the trailer and towing tractor. Cooperating with the friction shoe is a pneumatically actuated, spring-biased safety pin assembly which is mounted on the inner tongue member and engages mating holes on the outer tongue member at the shortened and extended tongue positions, to provide a backup lock for the tongue assembly should there be a loss of air pressure to the pneumatically actuated friction shoe. The safety pin is normally held in a locked position by the spring bias and is withdrawn therefrom whenever the normally pressurized actuator of the friction shoe is vented to allow telescoping of the tongue members so as to adjust the tongue length. In an alternative embodiment, the friction shoe is actuated by a pair of hydraulic cylinders powered by a hydraulic fluid that is pressurized via an air-to-hydraulic pressure converter mounted inside the hollow tongue members.

16 Claims, 13 Drawing Figures

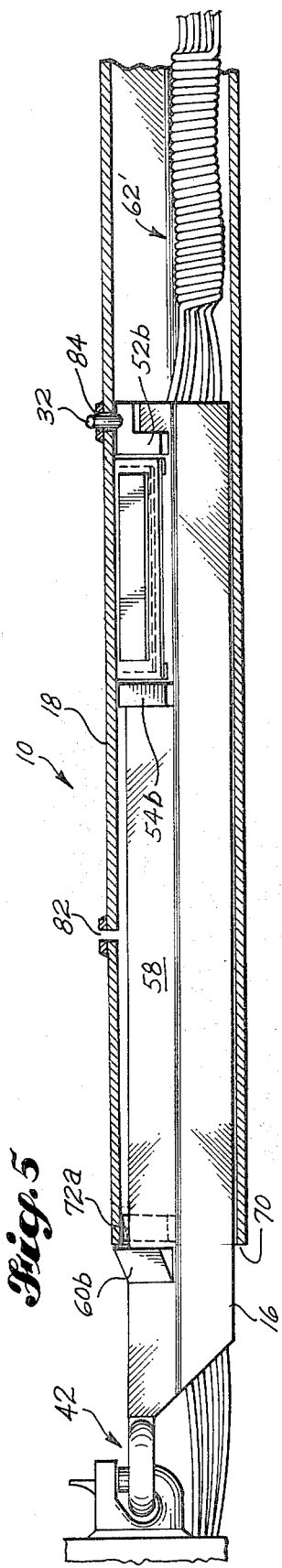
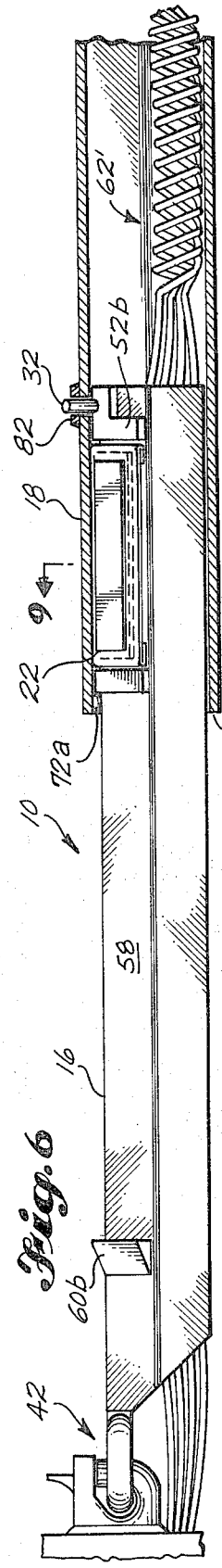
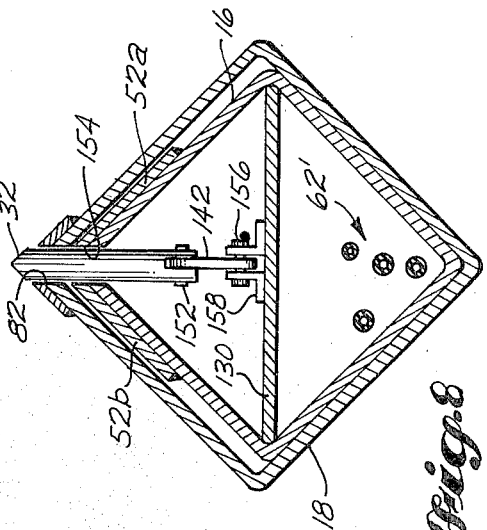
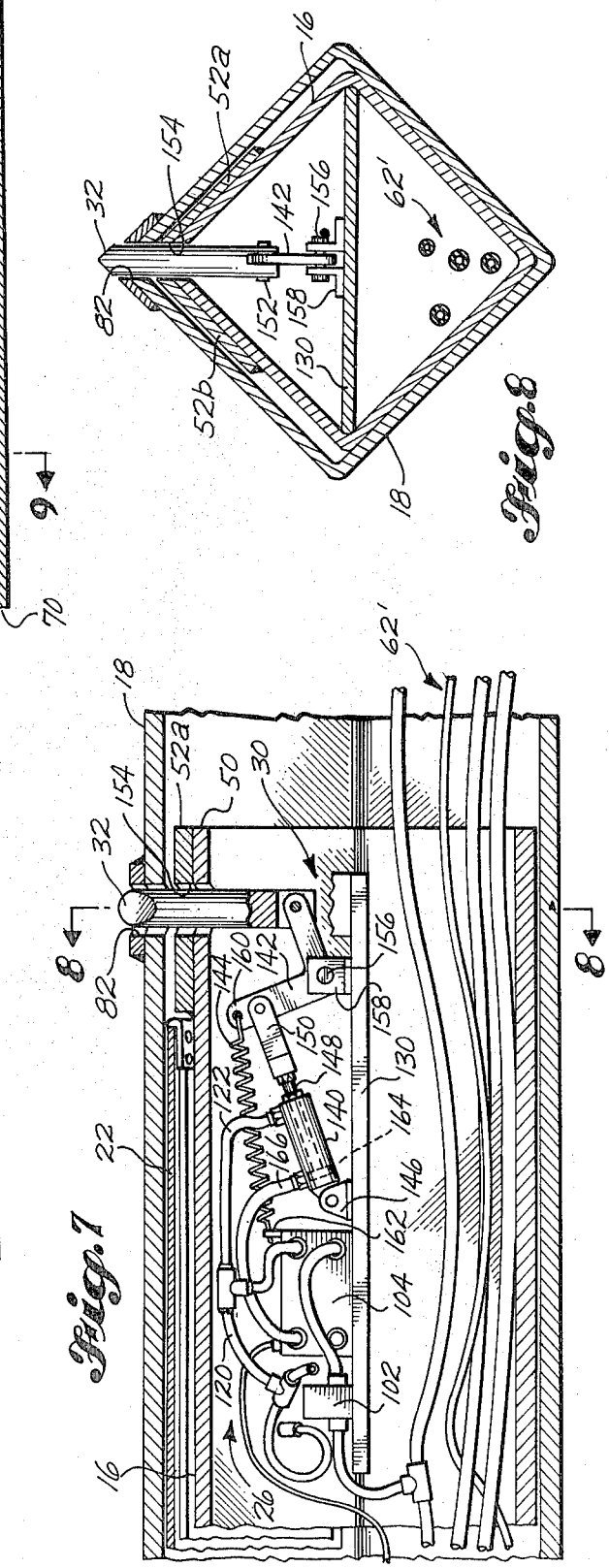

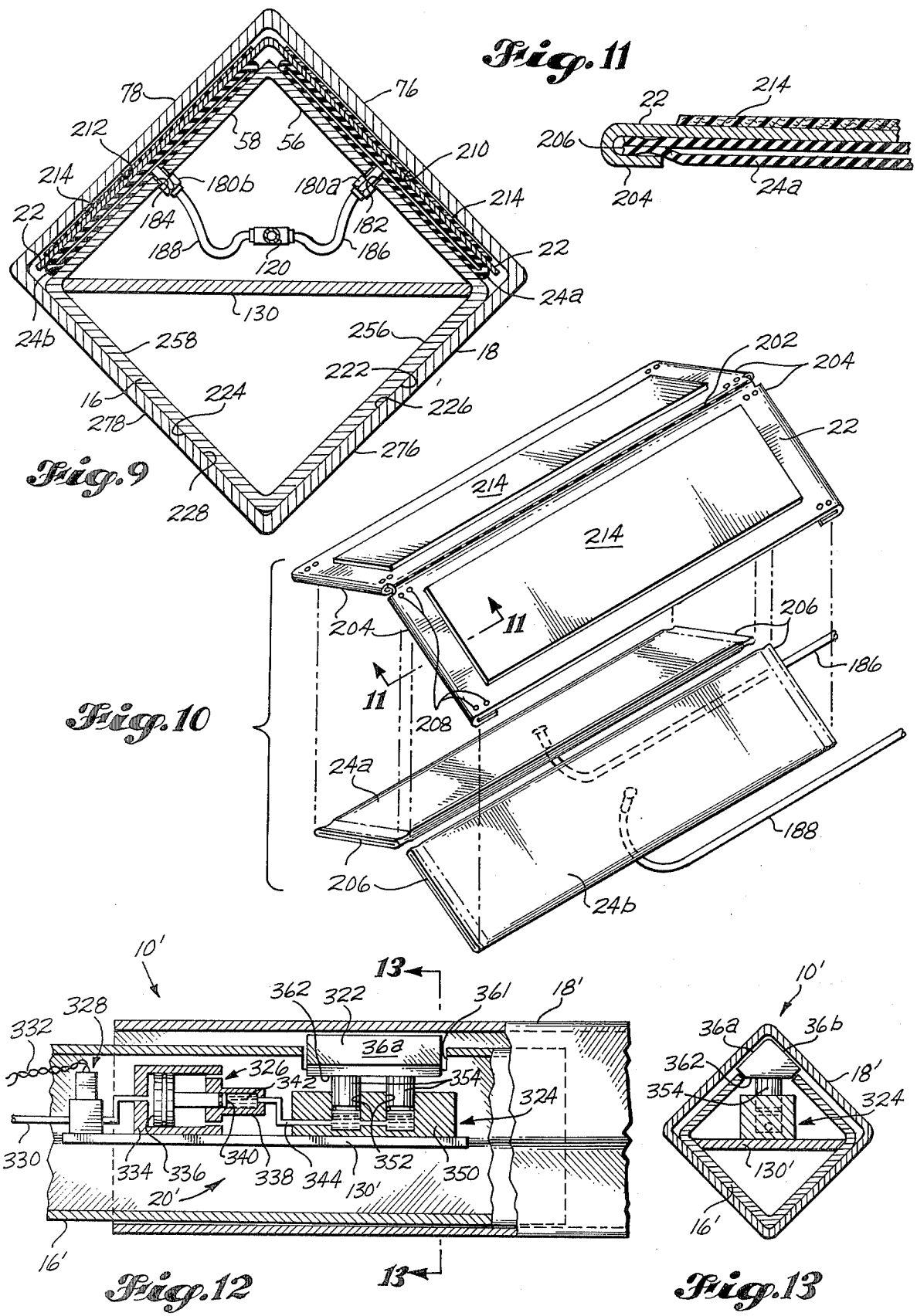

PRESSURE-OPERATED FRICTION LOCKING APPARATUS FOR SLIDABLY ADJUSTABLE TRUCK TRAILER COUPLING

BACKGROUND

The invention relates to truck trailer couplings that are slidably adjustable, such as extendable reach-type tongues and, more particularly, to remotely operated locking devices for releasably locking the coupling in each of its adjustable length positions.

Extendable reach tongues provide a needed versatility that is not available from trailer tongues having a fixed length. Restrictions have been imposed on many roads and highways as to the permissible gross weight of a truck trailer rig. These restrictions are, in part, based on the number of wheel axles and the separation between the axles along the length of the roadway. As the spacing between the axles increases, there is a corresponding increase in the permissible gross load per axle. Thus, by using an extendable reach tongue, a truck trailer rig can be spread out over a greater length of highway, thereby enabling the rig to carry a greater load. For highway travel, the extended length of the truck trailer rig is perfectly safe and sufficiently maneuverable.

However, for in-town driving of an unloaded rig, and for maneuvering in confined areas during loading and unloading operations, the extended length of the tongue is a disadvantage, and in some driving situations is totally impractical and/or unsafe. But, with an extendable reach tongue, the driver can adjust the length of the tongue to adapt his rig to the existing driving condition.

Extendable reach tongues of the above type are usually made of a pair of elongate, telescoping members that are equipped with locking mechanisms for releasably locking the members in either the shortened or extended position. In some cases the locking mechanisms are manually operated by means of a handle, shear pin, screw clamp, binding cam or the like mounted on and operable at the tongue. Since the driver must get out of the cab and walk back to the trailer tongue each time he either engages or releases the locking mechanism, it will be apparent that each time the tongue is to be extended or shortened, the driver will twice be required to leave the cab and walk back to the tongue.

To overcome this inconvenience, extendable tongues have been developed which are equipped with remotely operated locking devices. For example, one known system employs solenoids, remotely operated from the cab, to move a shear pin mounted on the outer tongue member, causing the pin to engage and disengage appropriately spaced pin receiving holes on the inner telescoping member of the tongue. Although such remotely operated locking devices do provide greater convenience and efficiency in the use of the adjustable length reach, they have not proved to be as durable as needed to withstand the adverse environmental and operating conditions normally encountered.

In particular, known types of remotely controlled locking devices typically employ a mechanism that, while locking the telescoping tongue members against any relative lengthwise sliding movement, allow such play between the tongue members and the pin or other locking element that the various parts are subject to excessively large impact loads and fatigue-causing metal-to-metal vibration. The impact loading occurs each time a tension or compression load is abruptly applied to the tongue, and the vibration loading occurs during road travel. These operating conditions have been found to cause, in too many instances, premature failure of the locking mechanism and the portions of the tongue members which cooperate with the locking mechanism.

Premature failure of a tongue locking mechanism during use of the rig constitutes a serious potential hazard. If, for example, a shear pin failed while the tongue was in a shortened configuration, the trailer may, under some circumstances, move uncontrollably and rapidly to the extended position of the tongue, or vice versa, and possibly cause injury to persons or property.

Both the remotely controlled locking devices, and those locking devices that are manually operated at the tongue, have the additional disadvantage of being located exteriorly of the tongue and thus exposed to damage from weather, rocks and other debris kicked up from the wheels of the truck while moving, and from other physical abuse normally encountered in the use of truck trailer rigs of this type. The vulnerability of exteriorly disposed locking mechanisms or associated components on available tongues of the extendable reach-type, has especially diminished the success and industrial acceptance of remotely controlled locking mechanisms which are usually more delicate and susceptible to damage under the above noted conditions.

Accordingly, one object of the invention is to provide a remotely operated locking mechanism for an extendable reach-type truck trailer tongue that is rugged, durable, safe and is capable of providing long trouble-free life.

A related object is to provide such a locking mechanism which is mounted with respect to the tongue so as to be sheltered from the environmental elements, and shielded against the type of physical abuse normally encountered in the use of heavy transport equipment.

SUMMARY OF THE INVENTION

In a slidably adjustable truck/trailer coupling having first and second elongate members that are slidably engaged for relative lengthwise movement, such as found in an extendable reach tongue of the above discussed type, a pressure-operated locking mechanism is provided including a friction shoe mounted for frictionally binding the coupling members together at selected of adjustment positions, fluid pressure actuator means mounted with the members for actuating the friction shoe, and fluid control means for remotely controlling fluid pressure delivered to the actuator means. The friction shoe is constrained against lengthwise movement with respect to one of the coupling members so that the shoe can be forced by the actuator means into frictional contact with the other of the members for frictionally locking such members against relative lengthwise movement.

In a preferred form of the invention, the locking mechanism is used in conjunction with tubular tongue members of generally square-shaped cross section and the friction shoe is mounted for transversely outward movement relative to the inner tubular tongue member and has an exterior friction surface mated to an interior corner of the outer tubular member. The shoe is thus forced by the actuator against the interior corner of the outer member causing a reactive force at the diagonally opposed outer surfaces of the inner tubular member which are thereby pressed into positive frictional contact with the corresponding interior corner of the outer tubular member. As a result, the actuated friction shoe develops a frictional binding force between the inner and outer tubular members that, in conjunction with the arrangement of the shoe and the geometry of the tubular members, holds such members with such rigidity and absence of play that the tongue members act as a unitary structure between the towing tractor and the trailer. This locking mechanism is far more durable than previously employed mechanisms because of the absence of any play either between the locking mechanism or between the tongue members which, as discussed above, was a primary cause of premature failure of the tongue parts.

Furthermore, the friction shoe and cooperating pressure actuator are disposed inside the tubular tongue members, and are thereby sheltered from the weather and shielded from physical abuse. In accordance with the preferred embodiments disclosed herein, the fluid control components are also disposed within the tongue members and are similarly protected. Fluid and electrical control lines are extended to the interiorly mounted fluid control components by routing such lines through the hollow interior of the inner tongue member.

Also in the preferred form of the invention, the remote control of the lock is effected from within the cab of the towing tractor, so that the tongue locking mechanism can be controlled by the driver without requiring that he leave the operator's seat of the vehicle.

In one preferred form of the invention, as disclosed herein, the actuator means for the friction shoe is provided by an expandable air-cell bladder arranged to force the friction shoe against the interior wall surfaces of the outer tubular member. In an alternate, preferred form of the invention, the actuator means is provided by one or more hydraulic cylinders supported by the inner tubular tongue member and having pistons connected to the friction shoe so as to drive the shoe into frictional engagement with the interior corner and adjacent interior wall surfaces of the outer tubular member.

For additional safety, the friction shoe and cooperating pressure actuator means operate in conjunction with a remotely controlled safety shear pin that engages, in shear, registering pin receiving holes in the inner and outer tongue members at both the extended and shortened positions of the tongue. The shear pin is biased, such as by a spring, so that it normally is held in the tongue locking position, and is automatically withdrawn from the locking position when the pressure applied to the shoe actuator means is vented to relieve the actuating force on the friction shoe and allow the tongue members to freely telescope. The shear pin is thus normally in a tongue locked position, providing a safety backup in the event of loss of pressure to the shoe actuator.

To provide a complete disclosure of the invention, reference is made to the appended drawings and following description of one particular and preferred embodiment.

BRIEF DESCRIPTION OF THE DRAWINGS

FIG. 5 is an enlarged elevational view of the extendable reach tongue in the shortened configuration of FIG. 2, and in which an outer tubular member of the tongue is shown in a lengthwise and vertical sectional view.

FIG. 6 is a view similar to FIG. 5 except showing the tongue in the extended configuration as depicted in FIG. 1.

FIG. 7 is a further enlarged, sectional view, cut by a lengthwise and vertically extending section plane passing through that portion of the tongue of FIGS. 1, 2, 5 and 6 where the pressure actuated shoe and safety pin locking mechanisms are mounted.

FIG. 8 is a transverse sectional view of the tongue taken generally along line 8—8 of FIG. 7.

FIG. 9 is another transverse sectional view of the tongue taken generally along a line 9—9 of FIG. 6.

FIG. 10 is an assembly view of the pressure actuated friction shoe that forms a component of the herein disclosed embodiment of the invention.

FIG. 11 is a detailed view of a fragment of the pressure actuated friction shoe of FIG. 10.

FIG. 12 is a fragmentary view, shown in lengthwise and vertical section, of an alternative embodiment of the internally mounted, pressure-operated locking apparatus of the invention.

FIG. 13 is a transverse sectional view taken generally along the line 13—13 of FIG. 12.

DETAILED DESCRIPTION

Figure 1:
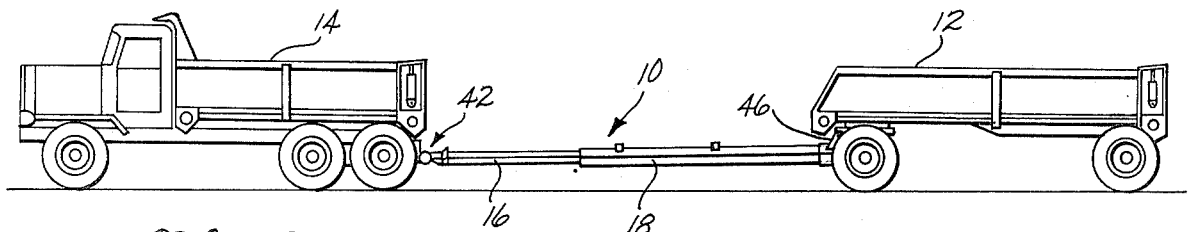
FIG. 1 is an elevation view of a truck trailer rig in which the trailer is joined to the truck by an extendable reach tongue incorporating the internally mounted, pressure-operated locking apparatus of the invention, and shows the tongue in its extended configuration.
Figure 2:
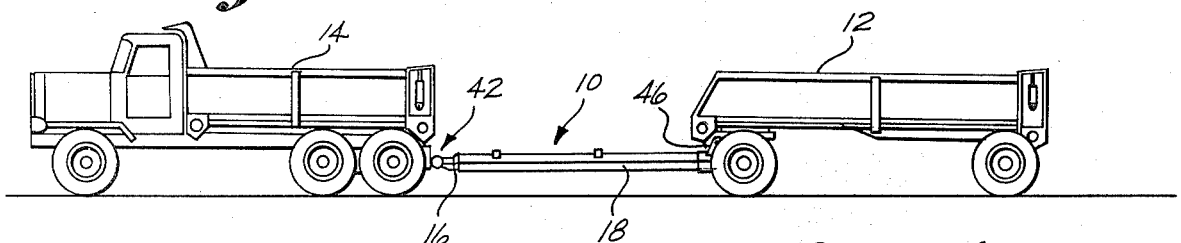
FIG. 2 is another elevation view of the truck trailer rig of FIG. 1 showing the extendable reach tongue in its shortened configuration.
Figure 3:
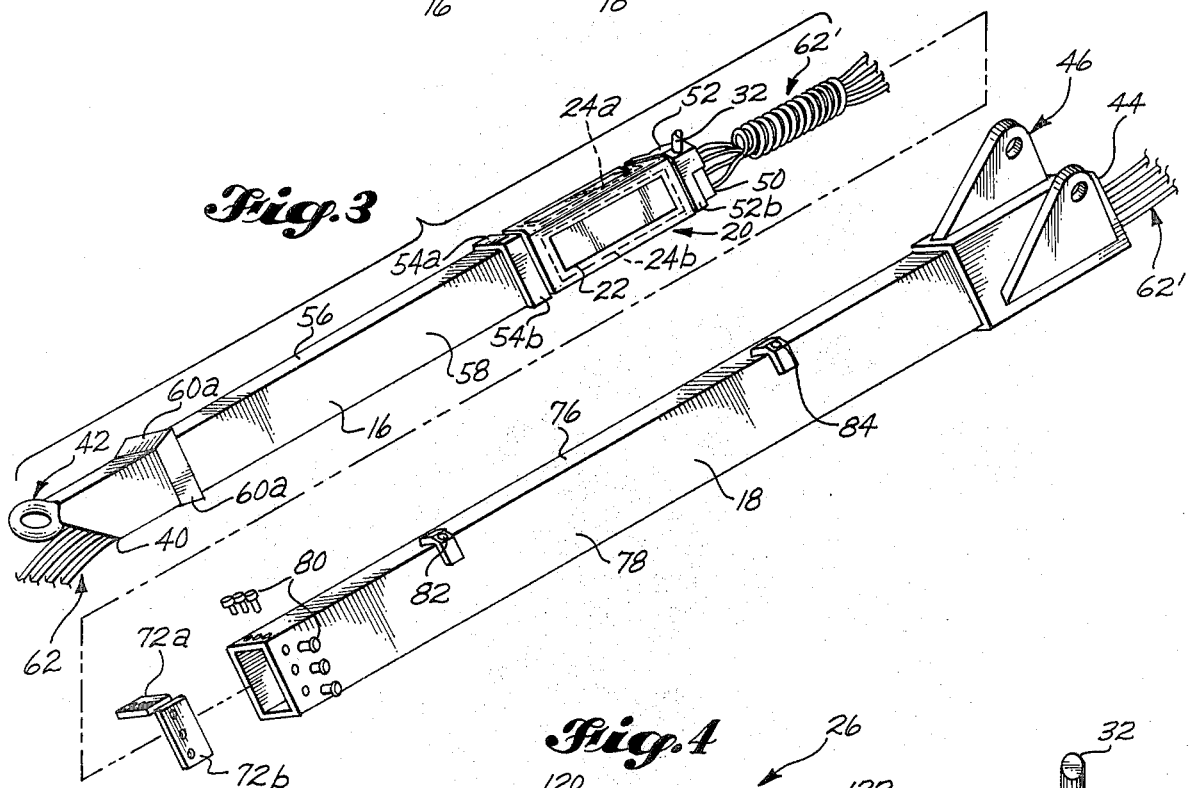
FIG. 3 is an assembly view of the extendable reach tongue shown in FIGS. 1 and 2.

In FIGS. 1 and 2, an extendable reach-type tongue 10 is arranged to tow a trailer 12 from behind a tractor truck 14, in which tongue 10 is respectively depicted in its extended configuration (FIG. 1) and its shortened configuration (FIG. 2). As shown in FIG. 3, tongue 10 is comprised of inner and outer telescoping members 16 and 18 which, in accordance with the present invention, cooperate with a pressure-operated friction locking apparatus 20 mounted internally of outer member 18 of tongue 10, for selectively locking tongue 10 in either its extended or shortened configuration.

Figure 4:
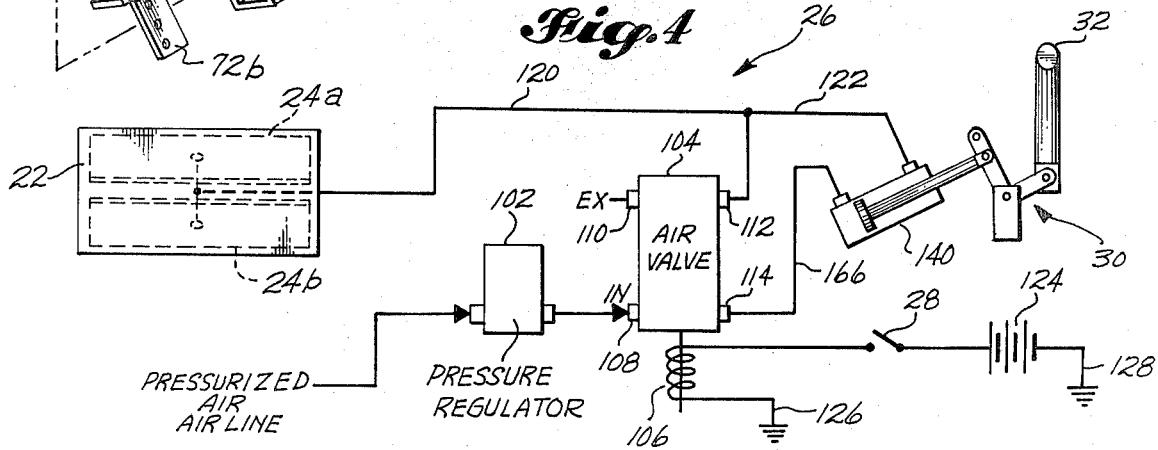
FIG. 4 is a schematic diagram of an electropneumatic control that forms part of the pressure actuated locking apparatus of the disclosed embodiment of the invention.

The primary elements of locking apparatus 20 are a friction shoe 22; a pair of pneumatically expandable air-cell bladders 24a and 24b shown in FIGS. 4 and 9–11 which, as more fully explained below, provide a fluid pressure actuator for forcing shoe 22 against the interior wall surfaces of tongue member 18 so as to lock the tongue members together; and a fluid pressure control subsystem 26 which, as illustrated in FIG. 4, is provided in this embodiment by an electropneumatic control system for selectively applying pressurized air to bladders 24a and 24b. Subsystem 26 includes a manually operated switch 28 which is preferably located in the cab of truck 14 for controlling the operating mode of the friction locking apparatus 20. Additionally, as is more fully described below, a fluid pressure actuated safety pin locking mechanism 30 operates automatically and in concert with the friction locking apparatus 20 to serve as a safety lock that holds the tongue members 16 and 18 in a fixed position of extension in the event of a failure of the air pressure to bladders 24a and 24b.

Now, with more detailed reference to FIG. 3, tongue members 16 and 18 are each formed of tubular steel stock of square-shaped cross section. The interior dimensions of outer member 18 are oversized relative to the exterior dimensions of member 16, so that when member 16 is slidably received within member 18, a free space gap exists between the confronting surfaces of at least two sets of corresponding sidewalls of the members, for accommodating therebetween the thickness of shoe 22 and bladders 24a and 24b of apparatus 20. One end 40 of inner member 16 is fitted with a hitch coupling component 42 and serves as the forward end of tongue 10 for releasably hitching the tongue, in the usual manner, to a complementary hitch component mounted at the rear center of tractor truck 14. At the opposite end 44 of outer tongue member 18, a trailer coupling component 46 is provided for connecting the rear end of tongue 10 in a conventional manner to the front axle assembly of trailer 12.

Components 42 and 46 are oriented on members 16 and 18 so as to rotate the square-shaped cross sections of the members 90° to a diamond orientation with respect to the ground (see FIG. 9). The diamond orientation, in which one pair of corners of each member lie in a horizontal plane and the other pair of corners of each member lie in a vertical plane, provides greater resistance to lateral and vertical loads on the tongue.

Apparatus 20 is mounted adjacent the end 50 remote from hitch component 42 and truck 14. Shoe 22 and bladders 24a and 24b are assembled, as described more fully hereinafter, into a unitary structure of right angle shape that rests on and straddles the upper and adjacent sidewalls 56 and 58 of member 16. The lengthwise dimension of shoe 22 is substantially less than the length of member 16, and shoe 22 is disposed adjacent rear end 50 of member 16 remote from the hitch coupling component 42 at end 40. To restrain shoe 22 against lengthwise sliding movement on member 16, two sets of bosses 52a, 52b and 54a, 54b are affixed to member 16 at longitudinally spaced apart positions on sidewalls 56 and 58. Bosses 52a and 52b are provided by irregularly-shaped segments cut from steel plate and welded to sidewalls 56 and 58, respectively, to provide forwardly facing shoulders that abut the rearmost end of shoe 22 adjacent member end 50. Bosses 54a and 54b are rectangular-shaped segments of steel plate welded to sidewalls 56 and 58 so that the rearmost transverse edges present rearwardly facing shoulders that abut the forwardmost end of shoe 22 and so that the forwardmost transverse edges present forwardly facing shoulders, the purpose of which is described below. Another set of bosses 60a and 60b are welded to sidewalls 56 and 58 of member 16 adjacent its forward end 40 to provide a rearwardly facing shoulder stop that limits forward telescoping of outer member 18 as the tongue is moved to its shortened configuration.

The forward end 40 of member 16 is open so as to receive the lengthwise passage therethrough of a plurality of air and electrical control lines 62 which extend rearwardly through the hollow interior of member 16 to apparatus 20. Except for switch 28 and the associated battery, all of the components of the control subsystem 26 are mounted within member 16 in approximate lengthwise registration with shoe 22, and certain of the lines 62 are connected to subsystem 26 thereat. The remaining control lines continue rearwardly as indicated a 62' through open end 50 at the rear of member 16 and hence through member 18, emerging through open end 44 thereof for connection to the air brake and electrical system of trailer 12. The control lines at 62' may be coiled as illustrated so as to be elastically stretchable and contractable in the dimension along tongue 10, in order to accommodate the telescoping of tongue members 16 and 18.

At the forwardmost end 70 of outer tongue member 18, a set of rectangular-shaped steel plate bosses 72a and 72b are riveted to the interior surfaces of the upper and adjacent member sidewalls 76 and 78 by rivets 80. Bosses 72a and 72b are disposed adjacent the forward interior edges of sidewalls 76 and 78 so as to ride on the confronting exterior surfaces of sidewalls 56 and 58 of the inner member 16 as shown in FIG. 5 and thereby take up the play resulting from the above mentioned free space gap between the interior and exterior dimensions of members 16 and 18, respectively. The rearwardly facing edges of bosses 72a and 72b are arranged so as to abut the oppositely and forwardly facing front edges on bosses 54a and 54b of member 16 as shown in FIG. 6, thereby serving as stops that limit the telescoping extension of member 18 relative to member 16.

Safety shear pin 32 is arranged adjacent end 50 of member 16 as illustrated in FIG. 3 to reciprocate vertically between a position generally recessed with respect to the upper ridge of member 16, and an extended position projecting upwardly beyond the ridge of member 16. In its extended position, pin 32 is alternatively received by one or the other of a pair of reinforced holes 82 and 84 located in the ridge member 18 at predetermined lengthwise spaced positions therealong. As described more fully hereinafter in connection with FIG. 7, the actuating mechanism 30 for pin 32 is mounted inside tongue member 16 adjacent the rear end 50 thereof.

With reference to FIG. 4, and as previously mentioned, the control subsystem 26 for the present embodiment is an electropneumatic subsystem mounted inside tongue member 16 adjacent shoe 22 and includes an air pressure regulator 102 for receiving pressurized air from one of control lines 62 connected to the pressurized air system of tractor truck 14. In this respect, one of the advantages of this embodiment of the invention is that the pressure-operated locking apparatus 20 operates from a source of pressurized air that is already available on tractor truck 14 for operating the rig's air brakes. Regulated air pressure from regulator 102 is connected to a two-way solenoid-operated air valve 104 including a solenoid coil 106. Valve 104 has an input port 108, an exhaust port 110 and two alternate output ports 112 and 114. Depending upon the electrical energization of solenoid coil 106, air valve 104 provides two alternative modes of operation. In a first mode, pressurized air at input port 108 is connected to the first output port 112 while the second output port 114 is vented to exhaust port 110. In the second mode, output port 114 is supplied with pressurized air from input port 108 and output port 112 is vented through exhaust port 110. An air line from exhaust port 112 divides into a first branch air line 120 which is jointly connected to air-cell bladders 24a and 24b associated with friction shoe 22. In another branch, an air line 122 from output 112 is connected to one side of a double-acting air cylinder which is described more fully below in connection with safety pin actuating mechanism 30. Output port 114 is connected to the opposite side of the double-acting air cylinder associated with mechanism 30.

To operate air valve 104, solenoid coil 106 is connected in a serial circuit including manually operated switch 28 and a dc voltage source provided by battery 124. Valve 104 is normally in the above mentioned first mode of operation in which input port 108 is connected to output port 112 for pressurizing bladders 24a and 24b. In response to closure of switch 28, solenoid coil 106 is energized to dispose valve 104 in the second of its operating modes, thereby venting bladders 24a and 24b and pressurizing output port 114. Air valve 104 and solenoid 106 are mounted inside tongue member 16 adjacent shoe 22, while switch 28 and battery 124 are disposed for remotely operating valve 104, such as from within the cab of tractor truck 14. For this purpose, an electrical line from switch 28, when mounted in the cab of truck 14, will extend to the rear of truck 14 and be combined thereat with lines 62 which pass into the hollow tongue at end 40 of tongue member 16, and from there extended to a connection with one end of solenoid 106 of air valve 104. The return path of the electrical circuit for operating solenoid 106 includes a ground 126 on tongue 10, and another ground 128 on the body of tractor truck 14.

With reference to FIG. 7, control subsystem 26 is mounted along with pin actuator mechanism 30 on a removable partition 130 extending horizontally and diagonally between the horizontally opposed interior corners of inner tubular tongue member 16. Regulator 102, valve 104 and mechanism 30 are mounted on the upper surface of partition 130, approximately at the same lengthwise position along member 16 as shoe 22 and thus adjacent end 50.

Actuator mechanism 30 for safety pin 32 is shown in FIG. 7 to include a double-acting pneumatic cylinder 140, a bell crank 142 and a tension biasing spring 144. One end of cylinder 140 is mounted on a pivot support 146 so as to accommodate pivotal movement of cylinder 140 in a vertical plane oriented lengthwise of tongue member 16. At the opposite end of cylinder 140, the associated piston rod 148 is connected by means of an extension link 150 to one leg of bell crank 142. The opposite leg of crank 142 is joined by a pivot pin 152 to a lower end of shear pin 32, the upper end of which is guided by a hole 154 in the ridge of member 16 reinforced by steel plate segments 152a and 152b. The knee of crank arm 142 is connected by a pin 156 to a pivot support bracket 158. One end of biasing spring 144 is connected at 160 to the same leg of crank arm 142 that is connected to pneumatic cylinder 140 via link 150, and the opposite end of spring 144 is anchored at 162 to a support, in this instance provided by the housing of valve 104, so as to maintain spring 144 under tension.

Mechanism 30 is shown in its normal state, with pin 32 locking tongue members 16 and 18 together via reinforced holes 154 and 82. Whenever shoe 22 is actuated by air pressure applied to the air-cell bladders via line 120 from valve 104, line 122 connected to pneumatic cylinder 140 forces the piston 164 to retract piston rod 148 and thereby rotate crank arm 142 counterclockwise, forcing safety pin 32 upwardly into its extended, locking position. Conversely, pin 32 is retracted by applying pressure air line 166 from output port 114 of valve 104 (FIG. 4) to force piston rod 148 outwardly, rotating crank arm 142 clockwise and drawing pin 32 downwardly so that it is generally recessed with respect to the ridge of inner member 16. The retraction operation occurs whenever air valve 104 is operated to relieve the actuator pressure on shoe 22 so as to allow telescoping of members 16 and 18. If there is a failure anywhere in the pneumatic system, then spring 144 will immediately force crank arm 142 to rotate counterclockwise, forcing pin 32 to its safety locking position, or if already there, then holding in such locking position.

The assembly of shoe 22 and air-cell bladders 24a and 24b is sandwiched as illustrated in FIG. 9 between the corresponding sets of inner and outer member sidewalls 58, 78 and 56, 76. To supply pressurized air to bladders 24a and 24b, each bladder has an air filler stem, 180a and 180b, respectively, which project through registering openings 182 and 184 provided in the corresponding sidewalls 56 and 58 of member 16. Stems 180a and 180b are connected by short sections 186 and 188 of an air hose, to the supply line 120 that extends from air valve 104 (see FIG. 4).

With reference to FIG. 10, shoe 22 and bladders 24a and 24b are preassembled into a unitary subassembly that is quickly and easily installed on, or removed from tongue 10. In particular, as shown in FIG. 10, shoe 22 is made from a sheet of mild steel, of ⅛ to 3/16 inches thick, which initially is flat and is roughly in the shape of a rectangle. The flat rectangular sheet is bent along a centerline 202 so that the symmetrical halves of the sheet form a right angle, corresponding to the right-angle relationship between the upper and adjacent sidewalls of tongue members 16 and 18. The width of each symmetrical half of the bent shoe 22 is approximately the same as the exterior width of sidewalls 56 and 58 of tongue member 16 and the interior width of sidewalls 76 and 78 of outer tongue member 18. The end portions of each symmetrical half of shoe 22 are formed with endwise projecting tabs 204 that are subsequently folded back under shoe 22 in a reentrant fashion, as illustrated in FIG. 11, so as to crimp the ends of bladders 24a and 24b as described below.

Each of bladders 24a and 24b is formed of a flattened tubular section of resilient airtight material such as provided by any of the various synthetic rubbers used for making tire inner tubes. Initially, the ends 206 of bladders 24a and 24b are open. Prior to mounting bladders 24a and 24b on shoe 22, the bladder ends 206 are vulcanized to form an airtight chamber therewithin. Next, the thusly vulcanized bladders are attached to shoe 22, by turning the shoe upside down and laying the bladders 24a and 24b lengthwise onto the inverted symmetrical half surfaces of shoe 22 and bending over and crimping tabs 204, using a press, onto the vulcanized ends 206 of the bladders. The width dimension of tabs 204 is selected to be slightly greater than the width of bladder ends 206 so that the folded tabs and main body of shoe 22 can be spot welded as indicated at 208 adjacent each side of each bladder to restrain the bladders against working laterally out from under shoe 22. In some cases it has been found desirable to provide a reentrant fold on the ends 206 of each bladder, prior to their being crimped under the shoe tabs 204. To increase the coefficient of friction between the upper surface of shoe 22 and the interior surfaces 210 and 212 of outer member walls 76 and 78, brake-like friction liners 214 are adhesively bonded to the upper surfaces of shoe 22.

To install the subassembly of shoe 22 and bladders 24a and 24b, outer tongue member 18 is slid off of member 16 to access the outer surface of member 16 between bosses 52a and b 54a and b. The shoe subassembly is laid onto surfaces 56 and 58 of member 16 so that the ends of shoe 22 nest inside of and in approximate endwise abutting relationship to the respective shoulders formed on bosses 52a and b and 54a and b. The air line connections provided by air line 120 and hose sections 186 and 188 are joined to filler stems 180a and 180b, and the outer tongue member 18 is slide into place over member 16 and the installed friction shoe and bladder subassembly. The subassembly of shoe 22 and bladders 24a and 24b is held in place by the shoulder abutments of bosses 52a and b and 54a and b and the constraints provided by walls 56, 76 and 58, 78 of members 16 and 18, respectively.

OPERATION

During normal highway or road travel, tongue 10 will be locked in either the shortened or extended positions as respectively shown in FIGS. 5 and 6, and air pressure will be continuously applied to bladders 24a and 24b to frictionally lock shoe 22 and the liners 214 thereon against the interior surfaces 210 and 212 of member 18. In particular, as as illustrated in FIG. 9, when pressurized air is applied to air filler stems 180a and 180b of bladders 24a and 24b, the bladders expand, forcing shoe 22 and liners 214 outwardly in reaction to equal and opposing forces directed against sidewalls 56 and 58 of inner member 16. Due to the square-shaped geometry of tongue members 16 and 18, and due to the arrangement of shoe 22 and bladders 24a and 24b so as to act between adjacent sets of tongue member sidewalls 56, 58 of member 16 and 76, 78 of member 18, additional friction locking and forced rigidity of the tongue members is achieved by reason of the opposite sidewalls and corner of tongue member 16 being forced into positive, seated frictional contact with the conforming interior corner and adjacent interior sidewall surfaces of member 18, lying diagonally opposite shoe 22. In particular, the exterior surfaces 222 and 224 of the lower and adjacent sidewalls 256 and 258 of member 16 are forced downwardly so as to wedge tightly against the mating interior corner surfaces 226 and 228 of the lower and adjacent sidewalls 276 and 278 of member 18. Thus, the transversely outwardly directed pressure forces acting between members 16 and 18 and shoe 22 not only provide a positive, friction binding force that locks the members against any lengthwise telescoping but also provides a clamping force that holds members 16 and 18 together with such rigidity, that play or any other relative movement between the members is virtually eliminated. With members 16 and 18 thusly locked together, there is no appreciable wear of the tongue components due to vibration, impact loading or other forces to which the tongue is subjected to during normal use.

Although the operating pressure and area size of shoe 22 will vary depending on the desired load bearing capability of tongue 10, by way of example, this embodiment provides for applying 100 psi air pressure to bladders 24a and 24b, and distributing that pressure over approximately 160 square inches of friction contact area on the upper surface of shoe 22. By using a suitably large shoe area, sufficient friction holding force can be obtained without deforming members 16 and 18 by too much concentration of force on the tubular walls of these members.

When tongue 10 is disposed in either its shortened or extended configurations, as respectfully illustrated in FIGS. 5 and 6, and shoe 22 has been actuated by air pressure supplied to the associated air-cell bladders, safety shear pin 32 is also maintained in its upwardly projecting locked condition. In the shortened configuration, pin 32 projects upwardly through reinforced hole 84 of the outer tongue member 18, and in the extended tongue configuration, pin 32 is received by reinforced hole 82 on member 18. Pin 32 serves as a backup or safety locking feature, but does not normally bear any shear loads between members 16 and 18 which are accommodated solely by the friction locking capability of the actuated shoe 22. However, in the event of failure of the air pressure supply to the bladders that actuate shoe 22, then shear pin 32 will serve to maintain the tongue members safely locked in one of their two alternative positions of extension.

Shoe 22 will normally be actuated only when tongue members 16 and 18 are in either their shortened or extended configuration, and safety shear pin 32 is properly engaged with either of holes 82 or 84. However, during maneuvering of the truck trailer rig such as during loading, unloading, parking, etc., shoe 22 can be used to temporarily lock the tongue members 16 and 18 at an intermediate position of extension, without safety pin 32 being in one of its locked positions.

To telescope tongue 10 between the shortened and extended configuration, the driver closes switch 28 (FIG. 4) to cause valve 104 to vent the normally pressurized air-cell bladders 24a and 24b. The actuating pressure on shoe 22 is thus relieved. Concurrently, pressurized air is supplied via output port 114 of valve 104 to air line 166 so as to cause air cylinder 140 to retract shear pin 32 of mechanism 30. Both the primary lock provided by shoe 22, and the secondary safety lock provided by pin 32 are now released, and tongue members 16 and 18 are free to telescope. Assuming that tongue 10 is initially in its shortened configuration, as shown in FIG. 5, the driver, having released the tongue locking mechanisms, pulls tractor truck 14 forwardly while trailer 12 remains stationary, telescoping inner tongue member 16 forwardly with respect to member 18. Such telescopic extension continues until bosses 72a and 72b on member 18 abut against bosses 54a and 54b on member 16, limiting any further telescopic extension. Switch 28 is now opened, and pressure is reapplied to the shoe actuating air-cell bladders to lock shoe 22 in place, and concurrently air cylinder 140 is operated to extend shear pin 32 upwardly into hole 82 on member 18. Tongue 10 is now in the extended configuration as depicted in FIG. 6. To return the tongue to the shortened configuration of FIG. 5, the foregoing operating procedures are repeated except that, in this case, the driver of tractor truck 14 now backs truck 14 toward trailer 12 causing member 16 to be telescoped inwardly into member 18 until stops 60a and b on the forward end of member 16 abut against end 70 of member 18.

Alternative Embodiment

With reference to FIGS. 12 and 13, an alternative embodiment of the invention is illustrated by a view of a longitudinal fragment of an extendable tongue 10'. As shown, tongue 10' includes an inner tubular member 16' of square-shaped cross section telescopically slidable inside on outer tubular member 18', also of square-shaped cross section. The pressure-operated friction locking apparatus 20' in this embodiment has a transversely movable friction shoe 322; a hydraulic actuator 324 for displacing shoe 322; an air pressure-to-hydraulic pressure converter 326 for supplying pressurized hydraulic fluid to actuator 324; and a solenoid-operated air valve 328. Apparatus 20' is mounted on a removable, horizontally disposed partition 130' inside of inner tubular member 16' and receives a supply of pressurized air over an air line 330 connected to valve 328, and receives a control signal over electrical lines 332 for operating solenoid valve 328. Valve 328 selectively connects air line 330 to a pressurized air input of converter 326 whenever the friction lock is to be actuated.

Converter 326 includes an air cylinder 334 within which an air-operated piston 336 is mounted for horizontal reciprocation, and a hydraulic cylinder 338 in which a hydraulic piston 340 is mounted for horizontal reciprocation. Hydraulic piston 340 is connected to air piston 336 such that whenever air pressure applied to air cylinder 334 displaces piston 336 from left-to-right, hydraulic piston 340 is similarly displaced from left-to-right in hydraulic cylinder 338 to force a hydraulic fluid 342, under pressure, out through hydraulic line 344 to actuator 324. The surface area of air piston 336 is selected to be substantially larger than the surface area of hydraulic piston 340 so that there is a multiplication of the pressure in multiplier 326 between the air pressure supplied to chamber 334 and the hydraulic pressure delivered by chamber 338 to hydraulic line 344. The multiplication factor is selected in accordance with the needed pressure on shoe 322, given the available air pressure and the surface areas of the pistons of hydraulic actuator 324.

Actuator 324 is provided by a solid body 350 having a pair of vertically oriented cylinders 352 bored therein and fitted with a pair of vertically reciprocating pistons 354. Hydraulic line 344 communicates with the lower portions of cylinders 352 such that when line 344 is supplied with hydraulic fluid under pressure, pistons 354 are forced upwardly in cylinders 352.

Shoe 322 has a solid, elongate body of generally triangle cross section as best illustrated in FIG. 13, and presents generally upwardly facing friction surfaces 360a and 360b that form a right-angle wedge or corner which is mated to the upper right-angle interior corner of outer tubular member 18'. An opening 361 is cut out of the upper portion of member 16 above actuator 324 to accommodate the movement of shoe 322. A lower horizontally disposed surface 362 of shoe 322 rests on and is carried by the upper ends of pistons 354 so that as pistons 354 reciprocate vertically in bores 352, soe 322 correspondingly reciprocates, transversely toward and away from the upper interior corner of member 18'.

Shoe 322 is actuated to frictionally lock members 16' and 18' together in a manner similar to the actuation of shoe 22 as described above. In particular, solenoid air valve 328 is operated via a remotely disposed switch to supply pressurized air to converter 326 which in turn hydraulically drives pistons 354 and shoe 322 upwardly toward the upper interior corner of member 18'. The pressure of shoe 322 on the upper interior corner of member 18' produces reactive forces transmitted via partition 130' to the sidewalls of member 16' which drive the lowermost outer corner of member 16' downwardly, wedging it against the mating, interior corner along the lower portion of the outer member 18'. The resulting, transversely outwardly directed pressure components acting between members 16' and 18' develop large frictional forces that bind the members against any lengthwise telescoping, and firmly unite the members in a rigid, unitary tongue structure.

While only certain particular and currently preferred embodiments of the invention have been disclosed herein, it will be readily apparent to persons skilled in the art that numerous changes and modifications can be made thereto without departing from the spirit of the invention. For example, while two separate bladders 24a and 24b are disclosed above for shoe 22, in some cases a one-piece bladder may be employed, extending crosswise under shoe from one lateral edge thereof to the other. Also, while shoe 22 of the embodiment of the invention depicted in FIGS. 1-11 is provided by a one-piece, right-angle bent metal plate, an alternative construction can provide for two separate plate-like shoes, each being disposed to act independently, between a separate set of corresponding sidewalls, such as the set of sidewalls 56 and 76, and the set of sidewalls 58 and 78, of members 16 and 18, respectively, as shown in FIG. 9.

The embodiments of the invention in which an exclusive property or privilege is claimed are defined as follows:

1. In an adjustable coupling apparatus for coupling a trailer to a truck and including first and second elongate, slidably engaging members that allow for adjustment of the coupling apparatus, and incorporating a releasable locking mechanism for selectively restraining such members against relative sliding movement, the improvement in said locking mechanism comprising:

friction shoe means mounted on the first member for transverse movement with respect thereto into frictional contact with the second member;

fluid pressure actuator means for selectively displacing said friction shoe in said transverse movement, wherein said actuator means comprises a hydraulic fluid actuator and has a pressurized condition in which it forces said friction shoe means into said frictional contact with the second member so as to frictionally lock said members against relative sliding movement, and has an unpressurized condition relieving said friction shoe means from said frictional contact with the second member so as to allow said relative sliding movement of said members; and fluid control means including means for selectively applying a pressurized hydraulic fluid to said hydraulic fluid actuator for selectively causing said actuator means to selectively assume either said pressurized condition or said unpressurized condition, wherein said fluid control means includes means for converting pressurized air into pressurized hydraulic fluid for being applied to said hydraulic actuator.

2. In an adjustable coupling apparatus for adjustably coupling a trailer to a truck in which said apparatus includes first and second elongate and slidably engaging members for affording such adjustability, and incorporating a releasable locking mechanism for selectively restraining said members against relative slidable movement, the improvement in said locking mechanism comprising:

friction shoe means mounted on the first member for transverse movement with respect thereto into frictional contact with the second member;

fluid pressure actuator means for selectively displacing said friction shoe means in said transverse movement, said actuator means having a pressurized condition in which it forces said friction shoe means into said frictional contact with the second member so as to frictionally lock said members against said relative slidable movement, and having an unpressurized condition relieving said friction shoe means from said frictional contact with the second member so as to allow said relative slidable movement of said members;

fluid control means connected to said actuator means for selectively causing said actuator means to assume either said pressurized condition or said unpressurized condition; and a pressure actuated safety pin mechanism including a shear pin means mounted on said members for movement between a locking condition preventing relative slidable movement of said members and an unlocking condition allowing relative slidable movement of said members, and a pressure-operated pin actuating means coupled to said shear pin means, said pin actuating means being responsive to said fluid control means for disposing said shear pin means in its locking condition when said actuator means for said friction shoe means is in its pressurized condition, and for causing said shear pin means to assume its unlocking condition when said actuator means for said friction shoe means is caused to assume said unpressurized condition.

3. The improvement set forth in claim 2 wherein said safety pin mechanism further comprises biasing means for biasing said shear pin means to its locking condition so as to cause said shear pin means to assume said locking condition in the event of loss of pressure in said fluid control means.

4. In the coupling apparatus of claim 2, wherein said first and second members are of tubular shape and wherein said first member is telescopically received within said second member, the improvement set forth therein in which said pin actuating means is mounted inside said first member.

5. In an extendable reach-type truck trailer tongue apparatus having inner and outer rigid tubular tongue members of mating rectangular cross section that are telescopically engaged for adjusting the tongue length, and having a releasable locking mechanism for selectively locking said members at a selected length and for releasing said members to permit telescoping to another selected tongue length, the improved locking mechanism in combination therewith comprising:

friction shoe means mounted on the inner tongue member for transverse and outward movement with respect thereto into frictional contact with an interior wall surface of the outer tongue member;

fluid pressure actuator means supported by said inner tongue member for selectively moving said friction shoe means between an unlocked condition in which said friction shoe means is released from said frictional contact so as to permit telescoping of said members and a locked condition in which said shoe means is forced outwardly into said frictional contact with the interior wall surface of the outer tongue member so that a force in reaction thereto causes an exterior wall surface portion of said inner member which lies generally opposite said shoe means to be present against a corresponding and contacting portion of the interior wall surface of said outer tongue member to frictionally bind said members against both longitudinal telescoping and transverse play; and fluid control means for causing said fluid pressure means to selectively dispose said friction shoe means in either said locked or unlocked condition.

6. In the apparatus of claim 5 wherein said members are relatively sized so that a free space gap exists between confronting parallel surfaces of at least one set of corresponding sidewalls of said inner and outer members, and wherein said friction shoe means and said fluid pressure actuator means are sandwiched between said confronting parallel surfaces of said one set of sidewalls.

7. The improvement of claim 6 wherein said fluid pressure actuator means comprises an air expandable bladder of resilient, airtight material of generally flattened shape laid between the surface of said inner member sidewall and said shoe means.

8. In the apparatus of claim 5 wherein said members are relatively sized so that a free space gap exists between confronting parallel surfaces of two sets of corresponding sidewalls of said inner and outer members, wherein said sets of corresponding sidewalls are adjacent so that the exterior surfaces of the sidewalls of said inner member meet at a common exterior corner and so that the interior surfaces of said sidewalls of said outer member meet at a common interior corner, and wherein said friction shoe means and said fluid pressure actuator means are sandwiched between said confronting parallel surfaces of both sets of sidewalls so that said friction shoe means is pressed outwardly against the adjacent sidewalls of said outer member in reaction to inwardly directed forces on the adjacent sidewalls of said inner member.

9. In the apparatus of claim 8 wherein said inner and outer members are square-shaped in cross section and are rotated 90 degrees to a diamond orientation with respect to a horizontal ground plane, and wherein said friction shoe means and actuator means are sandwiched between those two sets of corresponding and adjacent sidewalls that lie on opposite sides of an imaginary plane passing vertically and longitudinally through said first and second tongue members.

10. In the apparatus of claim 8 wherein said friction shoe means comprises a generally rectangular sheet of metal bent to conform to said exterior and interior corners of said inner and outer members, respectively, and is disposed along with said fluid pressure actuator means so as to straddle said common exterior corner of said inner member.

11. The improvement in claim 7, wherein said bladder has a fluid filler port coupled to said fluid control means through an opening formed in said sidewall of said inner tongue member.

12. The improvement of claim 5 further comprising a safety shear pin means mounted on said inner member for movement between a tongue locking condition in which said shear pin means engages both said inner and outer members to prevent relative telescoping thereof, and a tongue unlocking condition in which said shear pin means is disengaged from said outer tongue member for enabling telescoping of said members, biasing means for normally maintaining said shear pin means in its tongue locking condition, and pressure-operated pin actuating means responsive to said fluid control means for moving said shear pin means from its locking condition to its unlocking condtion when said fluid control means causes said actuator means to disposed said shoe means in said unlocked condition.

13. The improvement of claim 12 wherein said fluid actuator means includes a remotely controlled fluid valve, and wherein said valve and said pressure-operated pin actuating means are disposed inside said inner member.

14. A pressure-operated, releasable, friction locking mechanism in combination with first and second rigid, elongated and lengthwise slidably engaged members that adjustably couple a truck and trailer, wherein said first member has a pair of transversely angulated walls forming an interior corner that joins adjacent, generally flat surfaces of said first member, and wherein said second member has a pair of transversely angulated walls forming an exterior corner that joins adjacent, generally flat surfaces of said second member and is mated to said interior corner of said first member walls so that said adjacent, generally flat surfaces of said first member walls and said second member walls are disposed in proximate and opposing relation, said first and second members being relatively sized so that a free space gap exists between opposing surfaces of said first and second members, and wherein said locking mechanism comprises:

friction shoe means and fluid pressure actuator means therefore sandwiched between said opposing surfaces of said walls of said members so that said friction shoe means is displaceable by said fluid pressure actuator means relative to said opposing walls surfaces of said members for selectively causing a released condition in which said members are relatively slidable and a locked condition in which said shoe means is forced transversely and outwardly with respect to one of said members into frictional contact with said adjacent, generally flat surfaces of the other of said members so as to cause reactionary forces on said members that frictionally bind said members against both relative sliding movement and transversely play; and fluid control means for causing said fluid pressure means to selectively dispose said friction shoe means in either said locked condition or released condition.

15. In combination with the locking mechanism of claim 14, a pressure actuated safety pin mechanism comprising: a displaceable shear pin means arranged with said first and second members for movement between a shear pin locking condition preventing relative sliding movement of said members and a shear pin unlocking condition allowing relative sliding movement of said members, and a pressure-operated pin actuating means coupled to shear pin means, said pressure-operated pin actuating means being responsive to said fluid control means for disposing said shear pin means in its shear pin locking condition when said pressure actuator means associated with said friction shoe means is pressurized to dispose said friction shoe means in its locked condition, and for causing said shear pin means to assume its shear pin unlocking condition when said actuator means for said friction shoe means is unpressurized and said friction shoe means is in its released condition.

16. The combination set forth in claim 15 wherein said safety pin mechanism further comprises biasing means for normally biasing said shear pin means in its shear pin locking condition so as to cause said shear pin means to automatically assume said shear pin locking condition in the event of loss of fluid pressure in said fluid control means.

* * * * *

UNITED STATES PATENT AND TRADEMARK OFFICE
CERTIFICATE OF CORRECTION

PATENT NO. : 4,240,647
DATED : December 23, 1980
INVENTOR(S) : Milburn Lewis

It is certified that error appears in the above-identified patent and that said Letters Patent are hereby corrected as shown below:

"TRUCK TRAILER" in the title as it appears on the face sheet (item [54] should read --TRUCK/TRAILER--.

Column 1, line 4: "TRUCK TRAILER" should read --TRUCK/TRAILER--.
Column 6, line 1: "a" should read --at--.
Column 10, line 64: "on" should read --an--.
Column 11, line 48: "soe" should read --shoe--.
Column 11, line 68: the semicolon ";" should be a comma --,--.
Column 12, line 9: insert --22-- after "shoe".
Column 13, line 33: "Claim 2" should read --Claim 3--.
Column 13, line 64: "present" should read --pressed--.
Column 14, line 65: "disposed" should read --dispose--.

Signed and Sealed this

Fourteenth Day of April 1981

[SEAL]

Attest:

RENE D. TEGTMEYER

Attesting Officer    Acting Commissioner of Patents and Trademarks